United States Patent

[11] 3,588,257

| [72] | Inventors | Theodore R. Folsom<br>La Jolla;<br>William E. Weitz, Jr., San Diego; David A. Tennant, La Jolla, Calif. |
|---|---|---|
| [21] | Appl. No. | 767,197 |
| [22] | Filed | Oct. 14, 1968 |
| [45] | Patented | June 28, 1971 |
| [73] | Assignee | The United States of America, as represented by the Secretary of the Navy |

[54] FLAME PHOTOMETRIC METHOD AND APPARATUS FOR QUANTITATIVELY ANALYZING MATERIAL SPECIMENS
1 Claim, 2 Drawing Figs.

[52] U.S. Cl. .................................................. 356/187
[51] Int. Cl. .................................................. G01j 3/48
[50] Field of Search .......................................... 356/187, 82, 87; 250/83.3

[56] References Cited
UNITED STATES PATENTS
3,278,746  10/1966  Fiat .............................. 250/83.3
FOREIGN PATENTS
772,250  4/1957  Great Britain ................ 356/82
OTHER REFERENCES
Folsom, T. R., et al. " Flame Photometer Specialized for Cesium ". Applied Spectroscopy. Vol. 22, No. 2, March/April 1968. p. 109— 114.

Shurkus, Albert A., " Colorimetry" . Article From Radio News. June 1944. p. 25— 26, relied upon.

*Primary Examiner*—Ronald L. Wibert
*Assistant Examiner*—T. Major
*Attorneys*—R. I. Tompkins and Paul N. Critchlow ABSTRACT: Cesium specimens in solution are fed into a standard aspirating burner. A pair of photomultipliers monitor the flame radiation of the burner and band-pass filters are used with each photomultiplier to produce signals responsive exclusively to certain wavelengths of the radiation. One filter passes a narrow band of wavelength centered at that of cesium or the specimen being analyzed, while the other filter passes a proximate but separate band. Interposed at an angle to the axis of the beam of light from the flame to one photomultiplier, a plane of glass reflects a predetermined fraction of the beam toward the second photomultiplier. Since the signal from the cesium-responsive photomultiplier is responsive to the intensity of the cesium radiation and since the other photomultiplier is responsive exclusively to a significant and representative fraction of the background radiation, the two signals can be differentiated to provide a quantitative determination of the cesium content of the sample or specimen even when the flame fluctuates.

PATENTED JUN28 1971 3,588,257

INVENTORS
THEODORE R. FOLSOM
WILLIAM E. WEITZ, JR.
DAVID A. TENNANT
BY

ATTORNEYS

FLAME PHOTOMETRIC METHOD AND APPARATUS FOR QUANTITATIVELY ANALYZING MATERIAL SPECIMENS

The invention described herein may be manufactured and used by or for the Government of the United States of America for governmental purposes without the payment of any royalties thereon or therefor.

BACKGROUND OF THE INVENTION

The present invention relates to flame photometry and, in particular to the quantitative study of specimens or samples fed into the burner flame.

As already indicated, the present invention primarily is concerned with analyzing sea water samples and biological specimens for the presence of natural cesium. Although the concentration of this so-called 'minor alkali' is almost uniform over most of the ocean, slight anomalies have been uncovered and the character of these anomalies suggest that further study may lead to useful information concerning transport by sediments and by organisms. It further is of interest to analyze the tissues of certain marine organisms to determine how much cesium a typical population might transport during this migration and also how fast a typical individual might respond to concentration changes in its environment.

There are, however, a number of difficulties in the study of cesium in the ocean, one of which is the fact that the concentrations in sea water usually are quite small and, since previous procedures have required, for adequacy of signal-to-noise ratio, the extraction of substantial concentrations of cesium, the field specimens themselves have had to be quite large, i.e., in the order of two or more liters. The physical difficulties and expense of collecting and storing without contamination numerous large sea water specimens have seriously deterred efforts at widespread, extensive studies.

Another problem is that any such study must provide for discrimination against the relatively larger amounts of sodium, potassium and rubidium which are to be expected in marine specimens. The use of a flame photometer has been suggested for these studies both because of its speed and its well known success with the alkalis. In fact, cesium was the first element to be discovered by spectrometric methods and through 'burning' or samples in a flame. However, the brilliant blue spectral lines which historically have given cesium its name have not been found useful for measuring very small amounts of cesium. On the other hand, one may use one of the fainter lines, for example, one at 8521.1 A° in the near infrared. This latter line is relatively free of interferences but, because of its faintness, requires a larger amount of cesium than that which is concentrated from the larger samples.

For these and other reasons methods have been developed for the concentration and purification of small amounts of cesium. In particular, one of these methods teaches the extraction and intensification of cesium with an organic solution to permit the observation of the cesium line at 8521.1 Angstroms. This particular method was developed by Feldman and Rains in 1964 and described in an article entitled "The Collection and Flame Photometric Determination of "Cesium," reported in "Analytical Chemistry," 36, pages 405-409. In this method, use is made of a grating spectrometer as well as the remarkable sensitivity to the near-infrared that is now obtainable with certain photomultiplier tubes. Also, and of significant present importance, the method provides a chemical procedure for suppressing the effects of potassium and rubidium while greatly enhancing the illumination from traces of cesium. It can be noted at this point that, insofar as the method of the present invention relates to the study of cesium, the samples and standards to be analyzed are prepared in the manner described by Feldman and Rains and, more particularly, by transferring the cesium into a 3:1 mixture of methyl isobutyl ketone and cyclohexane containing sodium tetraphenylboron (TPB).

Although Feldman and Rains have made significant contributions, their procedure for monitoring the sample nevertheless requires repeated sweeps over a single spectral band particularly in the region containing the 8521.1 A° line. Such a procedure is found quite satisfactory for assay of 2—3 liter samples, but difficulties arise when the available samples are less than 1 liter of normal sea water. These difficulties are due primarily to the effects of statistical fluctuation of the signal and its inherent backgrounds whenever the smaller quantities of sea water are employed. The larger samples produce a better signal-to-noise ratio but, unfortunately, as has been indicated, the cost of collection and storing of samples below the surface of the ocean increases rapidly when more than one liter of sea water is needed.

The Objects

It is, therefore, a primary object of the present invention to provide method and apparatus specialized for use with small amounts of cesium or other similar samples, the method and apparatus permitting greater analytical sensitivity and precision than previously could be achieved when the smaller samples were employed.

A further object is to provide a method and apparatus capable of taking the fullest advantage of the chemical system of Feldman and Rains for 'intensifying' the signal from cesium by burning the cesium after transferring it to an organic solution of sodium tetraphenylboron.

Another generalized object is to provide apparatus for the above purposes which retains the speed and simplicity of conventional flame emission spectrometry while assuring greater stability and providing a much increased sensitivity.

Yet another object is to provide photometric apparatus capable of taking advantage of the signal enhancement of cesium derived from the use of TPB, the apparatus permitting the large signals from cesium to be clearly separated from the still larger signals from the sodium continuum which extends into the same spectral region.

A more specific object is to provide apparatus capable of monitoring both the sample radiation and the background flame radiation to permit a differentiation of the signals procured by other radiations, the differentiated signal being a net signal representative of the cesium content of the sample.

Summary of the Invention

These and other objects of the invention are achieved generally by feeding a solution of the specimen into a flame and dividing the total radiation emanating from a single aspect of the flame into two separate spectral bands, one of which includes the spectral band characteristic of the specimen and the other of which is representative of the background radiation of the flame. The separate bands are separately detected and their detected signals differentiated to provide a net signal representative of the radiation produced by the burning of the sample. By constantly monitoring the background of the cesium signal and differentiating to provide a net signal, the normal background fluctuations due to changes in gas pressure, aspiration rates and other phenomena are controllably minimized to increase sensitivity and provide better means for controlling overall precision.

The apparatus of the present invention utilizes a beam splitter for dividing the flame radiation into separate beams which are directed to separate photomultipliers to produce the signals to be differentiated. Filters are employed with each photomultiplier to limit their inputs to the desired frequency bands.

BRIEF DESCRIPTION OF THE DRAWINGS

The invention is illustrated in the accompanying drawings of which

DETAILED DESCRIPTION OF THE INVENTION

Figure 1:
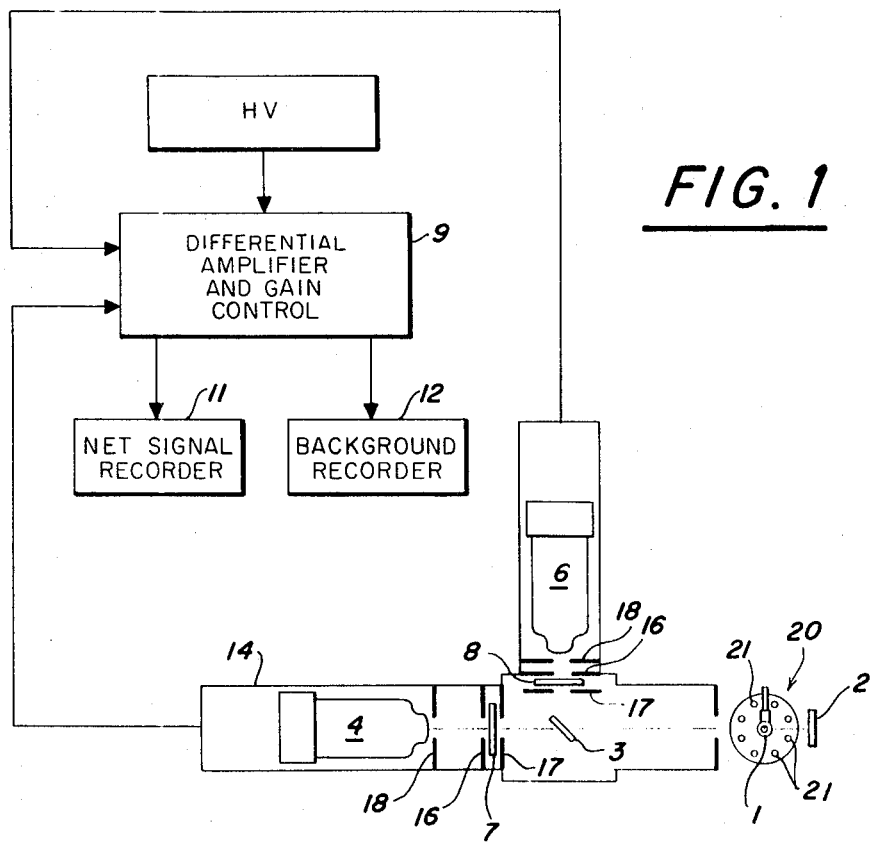
FIG. 1 is a schematic illustration of its major components.

Referring to FIG. 1 of the drawings, the major components of the photometric system include a burner 1, a reflector 2, a beam splitter 3, a pair of photomultiplier tubes 4 and 6, a pair of filters 7 and 8, a differential amplifier 9 and chart recorders 11 and 12. Although most of these components can be varied to suit particular operating conditions, the apparatus presently in use employs particular components which, in combination, have been found to provide a very satisfactory system with substantially increased sensitivity. For example, the system can utilize a standard Beckman No. 4020 aspirating burner and, in use, the oxygen pressure can be set at about 15 lbs. per square inch and hydrogen at about 3 lbs. per square inch. Reflector 2, which is disposed behind the flame of burner 1, is used to capture stray radiation and concentrate it upon beam splitter 3. The reflector illustrated in the drawing is an ordinary toystore mirror, and, since this mirror added about 60 percent to the signal strength, there appears to be no strong reason for using a more expensive one. Beam splitter 3 is a standard microscope cover-slip mounted at about 45° to the axis of the light incident upon it. Its function, which will be considered in greater detail, is to split the incident light or radiation into a desirable ratio which, in practice, may pass about 95 percent of the beam to the cathode of photomultiplier 4 and the other 5 percent to the cathode of photomultiplier 6. Photomultipliers 4 and 6 most suitably are powerful amplifiers each having 16 dynodes and also being of the type having their resistor-dividers mounted at their sockets. Since these powerful amplifiers produce substantial temperature fluctuations, the fluctuations must be suppressed although no justification has been found for refrigerating the tubes. However, their temperatures can be held together and kept from rapidly drifting by assembling all parts together in a heavy aluminum housing 14 which, preferably, is wrapped in a foam sheeting (not shown). Also, tubes 4 and 6 have relatively small cathode areas of about one-tenth inch diameter. Diaphragms 16, 17 and 18 are mounted in the housing and provided with apertures or stops which pass beams to the cathodes that are somewhat wider than the cathode diameters. As shown in the drawing, diaphragms 16 and 17 sandwich filters 7 and 8, while diaphragm 18 are mounted adjacent the cathodes of the tubes. Most suitably, the stops of diaphragm 16 and 17 can be one-fourth inch in diameter for the beam passing into tube 6 and they can be three-eighths inch in diameter for the beam passing into tube 4. The stops at the cathodes of the tubes are about one-fourth inch in diameter. Housing 14 may be provided with a conventional iris and shutter arrangement to control admission of the radiation.

Filters 7 and 8 are interference-type filters, filter 7 passing only a narrow band centered at the 8521.1 A° line of the cesium plus or minus 10 A° for example. Obviously, if the system is being used for the study of samples other than cesium, filter 7 will be designed to pass a band centered at another spectral line. Filter 8 passes a nearby band which should not contain much of the emission passed through filter 7 but instead, should pass a sample of the background of the flame which, as will be explained, contributes much of the total statistical fluctuation. For example, a filter passing 8409 plus or minus 45 A° has been found satisfactory. As may be known, interference filters are narrow band pass filters that may be made by depositing on glass two thin metallic films separated by a thin dielectric layer. These filters utilize the phenomenon of reflection to prevent the passage of energy of unwanted wavelengths.

Other features probably best can be described and understood by considering the manner in which the present system functions or operates to provide measurement of cesium samples. As has been indicated, the sample is prepared in accordance with the teachings of Feldman and Rains to achieve an intensification of the cesium signal when the cesium is burnt in an organic solution of sodium tetraphenylboron. As described by Feldman and Rains, the samples are prepared by transferring the cesium into a 3:1 mixture of methyl isobutyl ketone (hexone) and cyclohexane containing sodium tetraphenylboron (TPB). Generally, a 0.025 M concentration of TPB is preferred, although other concentrations ranging from 0.02 to 0.12 micrograms per milliliter also produce improved results. The sample is aspirated into the flame of the burner and, for this purpose, it is preferred to use a sample changer identified in FIG. 1 by numeral 20. This changer, which will be described in greater detail, mounts a series of eight 5 millimeter cylindrical burning cups 21 which contain separate solutions including standards and unknowns. In burning the cesium solution, the aspirator is immersed in the proper burning cup and the solution thus fed to the flame of the burner. Radiation from the flame strikes beam splitter 3 to divide the radiation into fractions which then are directed through filters 7 and 8 to the cathodes of photomultipliers 4 and 6.

Figure 2:
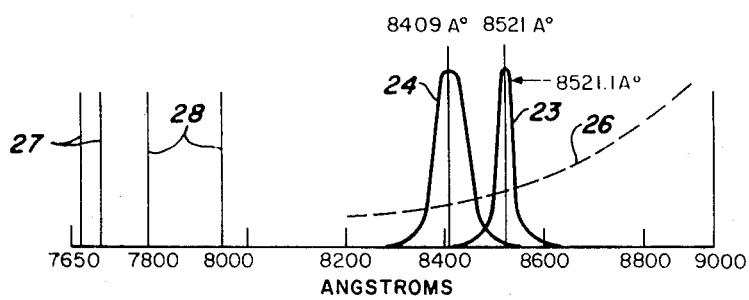
FIG. 2 illustrates graphically the optical ands transmitted by the two filters of the present apparatus, as well as the spectral lines of other chemical elements present in sea water samples or marine specimens.

Due to the presence of filters 7 and 8, their photomultipliers are responsive only to radiation within the wave bands which the filters are designed to pass. The results of these filters is illustrated in FIG. 2. As there shown curve 23, which is centered at the cesium line of 8521 A°, represents the band passed by filter 7, while curve 24 centered at 8409 A° represents the band passed by filter 8. Since the cesium is being burned in a solution of sodium tetraphenylboron, there is a sodium band which causes the emission of a continuum beginning to be significant near 8190 A° and continuing measurably into the region where cesium is being measured. This "background continuum" due to sodium is indicated in FIG. 2 by numeral 26. Consequently, band-pass filter 8 as well as photomultiplier tube 6 permit this large background to be monitored continuously. FIG. 2 also compares graphically the spacings between the nearest potassium and rubidium lines 27 and 28 and the cesium line and, as this graphic representation suggests, the 8521.1 A° peak of cesium is so well isolated from these lines that relatively crude filtering is capable of discriminating effectively against moderate amounts of potassium and rubidium.

To obtain a quantitative measurement of the cesium, the cesium signal produced by phototube 4 along with the "background continuum" produced by photomultiplier 6 are fed to differential amplifier 9. The net signal produced by the differential amplifier is recorded as a net signal by chart recorder 11. As will be appreciated, use of the differential amplifier to provide the net signal permits significantly improved control of the background signal so as to minimize the overall fluctuation and, in effect, to compensate for the high sodium in the background signal. Thus, the present apparatus provides a significantly improved signal to noise ratio which is capable of measuring smaller amounts of cesium and thus is capable of reducing the volume amount required to produce the cesium content necessary for the photometric analysis. Viewed in another manner, it will also be appreciated that the controls of a differential amplifier permit close control of the signal produced by the sodium content of the background radiation. This control, in turn, can be employed to minimize the effect of the sodium content of the signal produced by the photomultiplier tube 4 which, as will be recalled, is the signal resulting from the radiation centered at the cesium spectral line. Generally considered, the net result of the apparatus is to provide a measurement in which there is a bigger mean-signal to mean-noise ratio so that the measurements of the signal become more sensitive. Sensitivity, as has been stated, is improved by a factor of five over the more conventional spectrometers which have been deliberately specialized for use with small amounts of cesium.

In the design and use of the present apparatus, there are several other features to be considered. First and of substantial significance is to assure that both photomultiplier tubes observe the flame simultaneously and particularly from the same aspect. Preferably, effort should be made toward bringing the light from a relatively large portion of the flame, i.e., about 1 CM area. By so doing localized variations or fluctuations of the flame are minimized and, as is well known in flame photometry, such localized variations can produce considerable error.

Also, it is desirable to utilize physically similar optical paths to both cathodes. For example, the following specifications have been found suitable for measurements of the sea water cesium, although, of course, variations to suit differing conditions are expected. First, the burner tip of burner 1 can be placed about 1 inch below the optical axis of the radiation incident upon the beam splitter 3. Mirror 2, which is the simple toystore mirror, can be placed about 1½ inches behind the flame area. Beam splitter 3 is mounted so as to bisect the axis of the radiation and it is disposed at a distance of approximately 7¾ inches from the flame. As to the filters, filter 7 is placed about 2⅝ inches from the beam splitter while filter 8 is at a distance of 1¾ inches. Finally, diaphragm 18 of tube 4 is about 2¼ inches from its filter, while diaphragm 18 of tube 6 is about three-fourths inch from its filter.

Differential amplifier 9 can be of any standard, commercially available type having adequate amplification to provide the required sensitivity as well as means for balancing the signals of the two tubes. Similarly, recorder 11 can be a standard potentiometric self-balancing chart recorder, preferably one having a full-chart sensitivity of about 10 millivolts for each input. An amplifier achieves an impedance match to drive the recorder and, in the preferred form, biasing is provided for driving the recorder pen to the right-hand end of the chart so that the net signals may be viewed conveniently on the chart from left to right with respect to time. If desired, switches (not shown) can be provided for selecting the output of either tube 4 or tube 6, or the output can be the difference between the signals produced by tubes 4 and 6. Usually, the net signal will be recorded.

A second "background" recorder 12 similar to recorder 11 also can be employed. This separate recorder which responds continuously to the signal coming from phototube 6, monitors and records the background illumination of the TPB. Utilization of a separate recorder provides a record from which corrections can be made if small changes have occurred between the burning of a standard and an unknown.

A further consideration is that, in making precise measurements with a flame photometer, it is important to complete the burning of a series of standards and unknowns rapidly in a reproducible manner. Also, it is important to wash the burner immediately following the burning of each solution. Therefore, it is advisable to carry out burning and washing automatically and to achieve these purposes, a sample changer functioning in the manner of sample changer 20 can be employed. Although the mechanical details of chamber 20 are not a part of the present invention and, consequently, are not shown or illustrated in the drawing, it may be noted that the changer is in the form of a disc or table provided with suitable recesses for holding the eight cylindrical burning cups 21 in which the standards and unknowns are contained. Also, the changer should be capable of rotating in a timed "stop and go" manner so as to present each cup to the aspirator for a particular period of time which may be in the neighborhood of from 1 to 50 seconds depending upon the choice of the operator. Usually, 40 seconds is preferred when about 2 millimeters of solution is to be burned. Any suitable mechanism for rotating the disc in the so-called "stop and go" manner will be found to be satisfactory. Also, table 20 should be capable of being moved toward and away from the aspirator and this again should be coordinated with the 'stop and go' rotary movement. In one form of the changer, two motors are employed, one motor to provide the rotation of the samples and the other to produce the lifting of the cups into contact with the aspirator of the burner. Each motor shaft can, if desired, utilize small cam discs which operate standard microswitches. Functionally, the switches and cams provide an automatic control of the motors such that, once started, the motors run alternatively until the rotary table makes one complete revolution and the eight cups have been immersed. To control the burning period a timer may be used to interrupt the circuit of the table-lifting motor and the timer can be controlled by a relay. As previously stated, the mechanical details of this changer are not presently pertinent to the invention and it is assumed that its essential mechanical movements readily can be provided by the exercise of ordinary engineering know-how.

One manner in which the sample changer can be used to provide relatively accurate cesium measurements is to provide a sequence of solutions in which the first cup to be aspirated is filled with a reference solution of TPB, the second with an acetone wash, the third with a standard TPB solution, 0.3 micrograms Cs/10 ml, the fourth with another acetone wash, the fifth a TPB sample containing an unknown amount of cesium, the sixth an acetone wash, the seventh another TPB reference standard solution and the eighth a final acetone ash. Preferably measurements are improved by utilizing the differential net signal from a solution of TPB containing no cesium as a zero signal reference. While a small volume of this solution is being burned, the relative amplifications (gains) of the amplifier tubes can be adjusted to bring the recorder trace to a convenient "null." Also, the gain adjustment can be selected so that the pure TPB indicates the same signal amplitude as that which arises from the hydrogen and oxygen flame alone. This gain balancing can be done in the conventional manner by adjusting the voltages supplied to the photomultipliers.

Summarizing, the present apparatus and method provide a means for measuring small samples of materials, such as cesium, which, functionally, provides a sensitivity about five times that previously achievable. The improved sensitivity is due to improved signal to noise ratio which, in turn, is due to the ability to control the large background signal present in the sodium continuum. Due to the improved sensitivity, water samples even smaller than one liter may be found sufficient. Consequently, the expense of collecting the larger water specimens is substantially minimized to permit more extensive research.

One of the principal features enabling the improved sensitivity is the use of the beam splitter and the pairs of filtered photomultipliers which permit simultaneous monitoring of the cesium signal along with a representative flame background signal viewed at the same aspect so that signal and background appear to fluctuate simultaneously and the fluctuation can be largely compensated by electronic means. Differentiation provides a way of controlling the background signal to control overall precision. Also, the photomultipliers both "view" a relatively large portion of the flame to minimize error produced by localized fluctuations. Recording of the net signal, as well as the background signal, can provide improved results by providing visual records that permit corrections on the recorded data.

Obviously many modifications and variations of the present invention are possible in the light of the above teachings. It is therefore to be understood that within the scope of the appended claims the invention may be practiced otherwise than as specifically described.

We claim:
1. A method for the quantitative analysis of cesium in small specimen samples by flame photometry comprising:
   providing a flame,
   introducing a cesium specimen dissolved in a solution containing sodium tetraphenylboron into said flame to excite radiation including a sodium background continuum and a characteristic cesium line,
   collecting said radiation emanating from only a single aspect of said flame,
   dividing said emanating radiation into at least two narrow separate spectral bands including a first band containing said sodium continuum and centered on said cesium line at 8521.1 A° and a second relatively broader band containing said sodium continuum and being within the range of 8190 A° to about 9000 A°, said second band containing no appreciable energy within said first band centered at 8521.1 A°, separately detecting said first and second spectral bands to provide first and second electrical signals representative of the radiations present in said first and second spectral bands, monitoring and detecting said second signal to provide a background control signal, inputing said first and second signals into a difference amplifier to derive a difference signal output which is a net quantitative measure of the cesium content of said sample, and applying said control signal to control the output of said difference amplifier to minimize fluctuations due to variations in said background continuum, whereby the effect of said background fluctuation on the quantitative analysis of the specimen can be minimized sufficiently to permit the use of significantly smaller specimens.